United States Patent [19]

DeMello et al.

[11] 4,368,418
[45] Jan. 11, 1983

[54] APPARATUS FOR CONTROLLING HIGH VOLTAGE BY ABSORPTION OF CAPACITIVE VARS

[75] Inventors: F. Paul DeMello, Burnt Hills; Robert J. Ringlee, Schenectady, both of N.Y.

[73] Assignee: Power Technologies, Inc., Schenectady, N.Y.

[21] Appl. No.: 256,062

[22] Filed: Apr. 21, 1981

[51] Int. Cl.³ .............................................. H02J 3/16
[52] U.S. Cl. .................................... 323/201; 323/205
[58] Field of Search ............... 310/68 R, 72, 166, 211; 323/201, 205, 206, 208

[56] References Cited

U.S. PATENT DOCUMENTS

| | | | |
|---|---|---|---|
| 728,322 | 5/1903 | Steinmetz | 323/208 |
| 1,738,726 | 12/1929 | Philip | 323/208 X |
| 2,086,421 | 7/1937 | Jones et al. | 323/201 |
| 3,466,477 | 9/1969 | Newill | 310/68 R |
| 4,017,790 | 4/1977 | Friedlander | 323/206 |

*Primary Examiner*—A. D. Pellinen
*Attorney, Agent, or Firm*—Hubbell, Cohen, Stiefel & Gross

[57] ABSTRACT

Apparatus for controlling high voltage by absorption of capacitive vars, comprising a stator (10) having a core and a three phase winding (14) connected to the high voltage, and a rotor (12) having magnetic material (20) exhibiting a sharp magnetic saturation. The rotor (12) includes longitudinally extending damper bars (22) imbedded in grooves or slots (24) in a manner similar to the bars used in a squirrel cage rotor. The magnetic structure of the rotor can be of two types—a symmetrical structure for asynchronous operation, and a salient pole structure for synchronous operation. In the case of the symmetrical rotor construction, the stator (10) and rotor (12) constitute a rotating induction reactor (8) which operates in the same manner as a free running, unloaded induction motor. The induction reactor (8) exhibits characteristics similar to a saturable reactor with respect to var versus voltage absorption, but does not have the undesirable harmonics normally present in the saturable reactor. In the case of the salient pole rotor construction the stator (10) and rotor (12) constitute a rotating synchronous reactor which operates in the same manner as a free running unloaded reluctance motor. A series compensation arrangement can be provided by connecting capacitance means (24,26,28) in series with the stator winding (14) to reduce the droop characteristic of the incremental saturated inductance of the reactor (8) to almost zero. The transformer connecting the rotating reactor to the high voltage system can be provided with amps for steady state adjustment of the voltage level to be controlled.

19 Claims, 8 Drawing Figures

FIG. 3.1
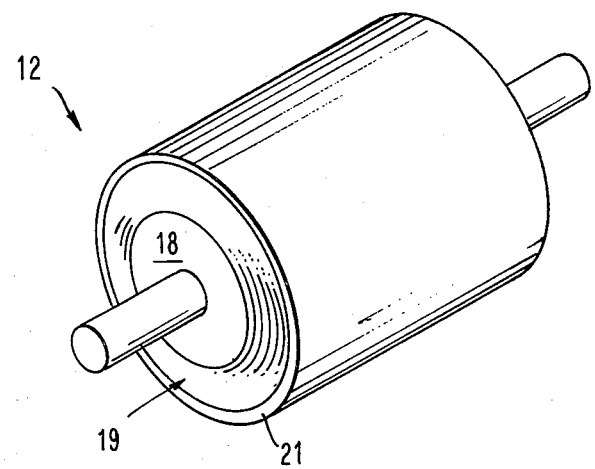
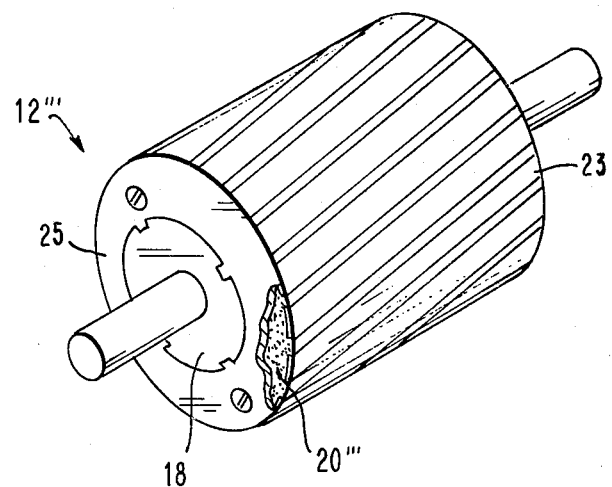
FIG. 3.2

FIG. 4.1
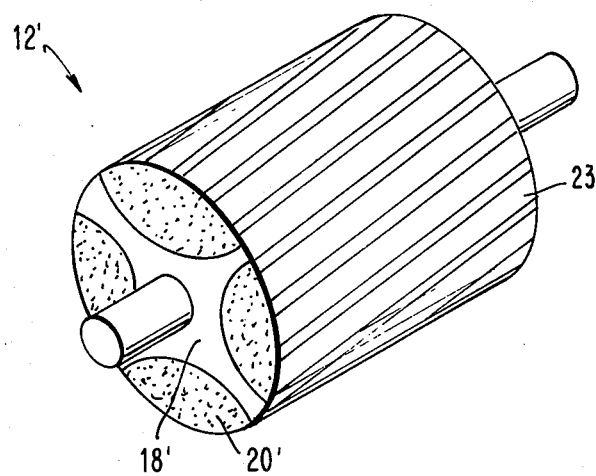
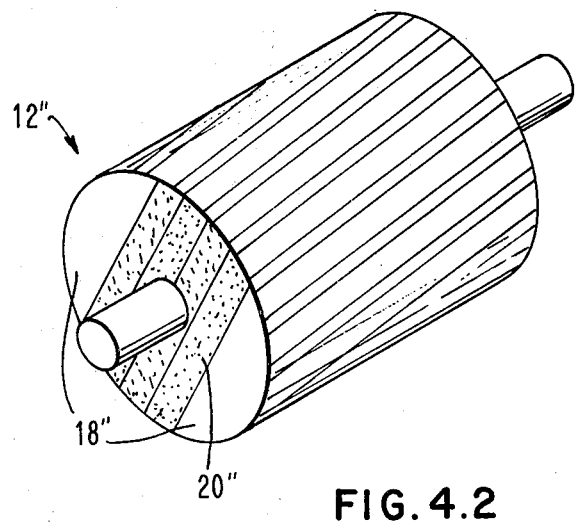
FIG. 4.2

APPARATUS FOR CONTROLLING HIGH VOLTAGE BY ABSORPTION OF CAPACITIVE VARS

TECHNICAL FIELD

The present invention relates to voltage control in three phase power systems, and more particularly to a method and apparatus for absorption of capacitive vars (units of reactive power) required to control the voltage in power networks such as in high voltage and extra high voltage transmission and/or underground high voltage cables.

BACKGROUND ART

Voltage control in a number of systems with high voltage, extra high voltage transmission and/or underground high voltage cables is an important system design consideration. Absorption of capacitive vars required to control voltage can presently be achieved by (a) underexcited synchronous condensers, (b) linear reactors, or (c) static var sources with thyristor control or of the saturable type. Each of these known devices has its own advantages and disadvantages.

Specifically, synchronous condensers are expensive, unreliable, and have finite absorption capability beyond which the condenser will slip poles. Aside from the pulsation in voltage in the process of slipping, the action of a voltage regulator would provide positive feedback once the condenser locked in step on a pole of opposite polarity. While this can be circumvented by special control logic, the net effect would still be the loss of the condenser. Hence, the condenser, unlike a reactor, would have a maximum absorption capability determined by dynamic rather than short term thermal considerations.

Synchronous condensers have had application in HVDC converter stations because of the need for short circuit capacity as required for proper commutation of converter valves.

Linear reactors are not very effective in limiting overvoltages since their absorption of vars would be proportional to the voltage squared, as contrasted with saturable reactors or thyristor controlled reactors.

Static var sources, of the thyristor controlled type, produce harmonics. They can control overvoltages very effectively within the off-on range of the valves. Beyond the fully-on point, the reactor would have the same overvoltage absorption capability of the linear reactor, subject to thermal limitations. Static var sources, of the saturable type, exhibit excellent voltage control characteristics and will exhibit the same droop characteristics regardless of overvoltage. Control of overvoltage would be very effective, of course, within thermal limitations. Here, however, harmonics are a problem and, special winding arrangements or filters must be provided to absorb undersirable harmonic generation.

These disadvantages of the prior art are overcome by the present invention.

Accordingly it is an object of the present invention to provide a method and apparatus for voltage control in power system networks particularly involving high and very high voltage overhead and/or underground transmission.

It is another object to provide absorption of capacitive vars required to control high voltages without the disadvantages associated with conventional methods and devices, such as dynamic limitations on maximum absorption capability, undesirable harmonics, cost and reliability.

It is a further object to provide for voltage control in systems where the voltage control device must exhibit low values of incremental inductance such as is required for commutation of currents in converter valves.

BRIEF DESCRIPTION OF THE DRAWINGS

FIGS. 3.1 and 3.2 show perspectives of cross-sectional views of the rotor of the induction reactor using two types of construction.

FIGS. 4.1 and 4.2 are perspective cross-sectional views of two types of rotors of the synchronous reactor.

DISCLOSURE OF INVENTION

These and other objects are achieved by the present invention which provides an apparatus for controlling high voltage by absorption of capacitive vars, comprising a stator having a core and a three phase winding connected to the high voltage, and a rotor having magnetic pole pieces exhibiting a sharp magnetic saturation. In one alternative of the invention the rotor includes longitudinally extending damper bars imbedded in grooves or slots in a manner similar to the bars used in a squirrel cage rotor. The damper bars are made of a conducting material, preferably copper, and enable generation of the torque required for windage losses at negligible slips as well as serving to damp rotor oscillations. The stator and rotor constitute an induction reactor and operate in a similar manner to a free running, unloaded induction motor having characteristics similar to a saturable reactor with respect to var versus voltage absorption, without harmonic disadvantages normally present in such a saturable reactor. In one arrangement, the induction reactor of the present invention includes capacitance connected in series with the stator winding to reduce the droop characteristic of the incremental saturated inductance of the reactor to almost zero.

In another alternative the rotor is constructed of pole pieces of highly saturable magnetic material and rotation is maintained by reluctance torque at synchronous speed. The shape of the magnetic pole pieces is designed to carry uniform flux density along the flux path so that saturation will occur with the desired sharp characteristic. The shape and magnetic composition of the pole pieces can also be designed to produce other types of saturation characteristics.

ALTERNATE MODES FOR CARRYING OUT THE INVENTION

Figure 1:
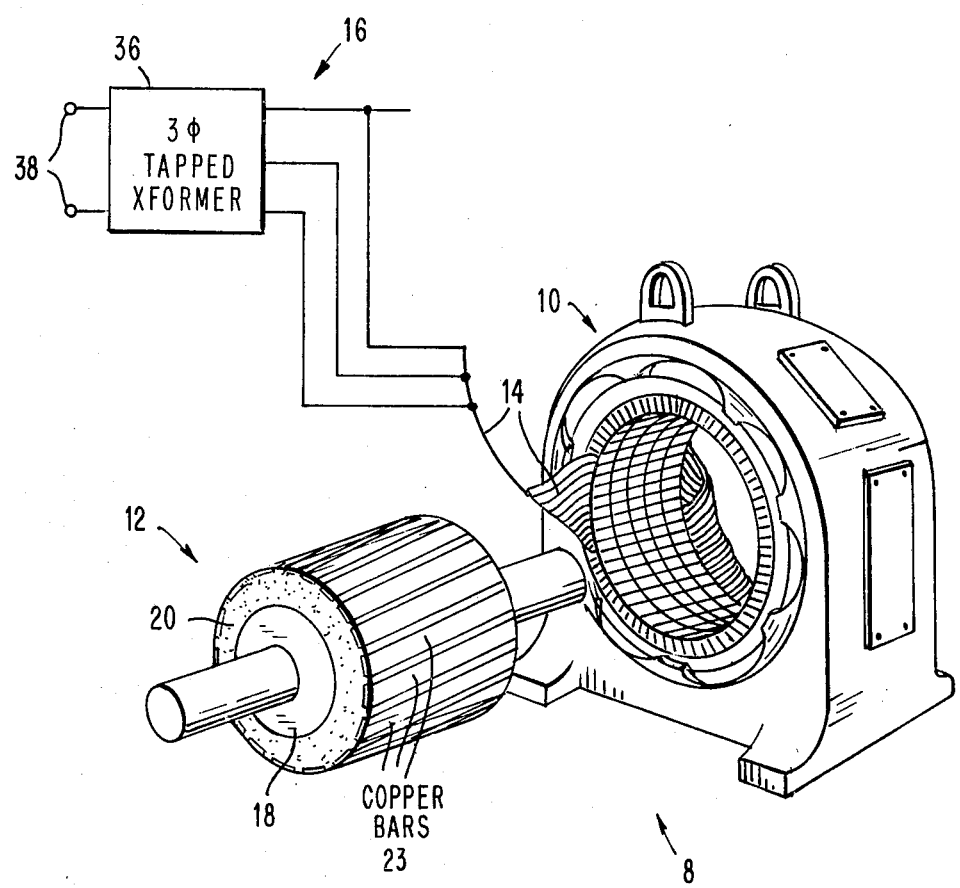
FIG. 1 is a perspective view of the rotating induction reactor of the present invention for controlling voltage in a high voltage system.

Referring to FIG. 1 there is shown a perspective view of the rotating induction reactor of the present invention generally referred to by the reference numeral 8 comprises a stator 10 and a rotor 12. Stator 10 includes a core and winding similar to those of a conventional three phase alternating current motor or generator. As shown and preferred, the stator winding 14 is connected to a high voltage polyphase network 16 and such stator winding 14 is insulated with a suitable material normally used in salient pole or round rotor generators.

Rotor 12 includes a rotor spider 18 made of nonmagnetic material such as stainless steel and concentric cylinder of magnetic material 20 characterized by a very sharp saturation. In FIG. 3.1 the rotor magnetic material is shown as a concentrically wound strip 19 of grain-oriented silicon iron appropriately secured to the rotor spider by welds and bolts. A sleeve 21 of nonmagnetic conducting material (copper or aluminum) surrounds the flux carrying rotor core for the purpose of providing paths for the slip frequency currents produced through induction and required to generate torque to overcome friction and windage.

In FIG. 3.2 the rotor construction is similar to that of a conventional squirrel cage motor except that the concentric laminations 20''' of magnetic material are designed to saturate sharply, and the damper copper bars 23 imbedded longitudinally on the rotor surface aare sized to produce adequate torque to overcome windage losses. These damper bars 23 are connected by end rings 25 on either side of the rotor. The amount of copper would be typically one-fifth to a tenth of the amount of an induction motor of equivalent MVA rating.

There is preferably no prime mover involved with the induction reactor 8 of the present invention and, accordingly, there is no requirement for a particular rotor speed. Thus, choice of rotor speed can be optimized, if desired, based on considerations of structural preferences and minimization of windage losses.

Although horizontal construction has been shown in FIGS. 1 and 3, vertical options could also be considered if found to be advantageous from structural points of view.

It should be noted that the rotor 12 may preferably have a laminated construction in order to minimize eddy current losses in operating regions where the incremental inductance, due to saturation, is largely air core inductance. On the other hand, since the slip is very small in the reactor 8 of the present invention, if desired, a solid rotor may be employed in place of the laminated rotor. In either instance, the rotating induction reactor 8 of the present invention exhibits the functional characteristics of a saturable reactor, in terms of var versus voltage absorption but, by contrast, produces a negligible amount of harmonics as compared with conventional saturable reactors.

Figure 2:
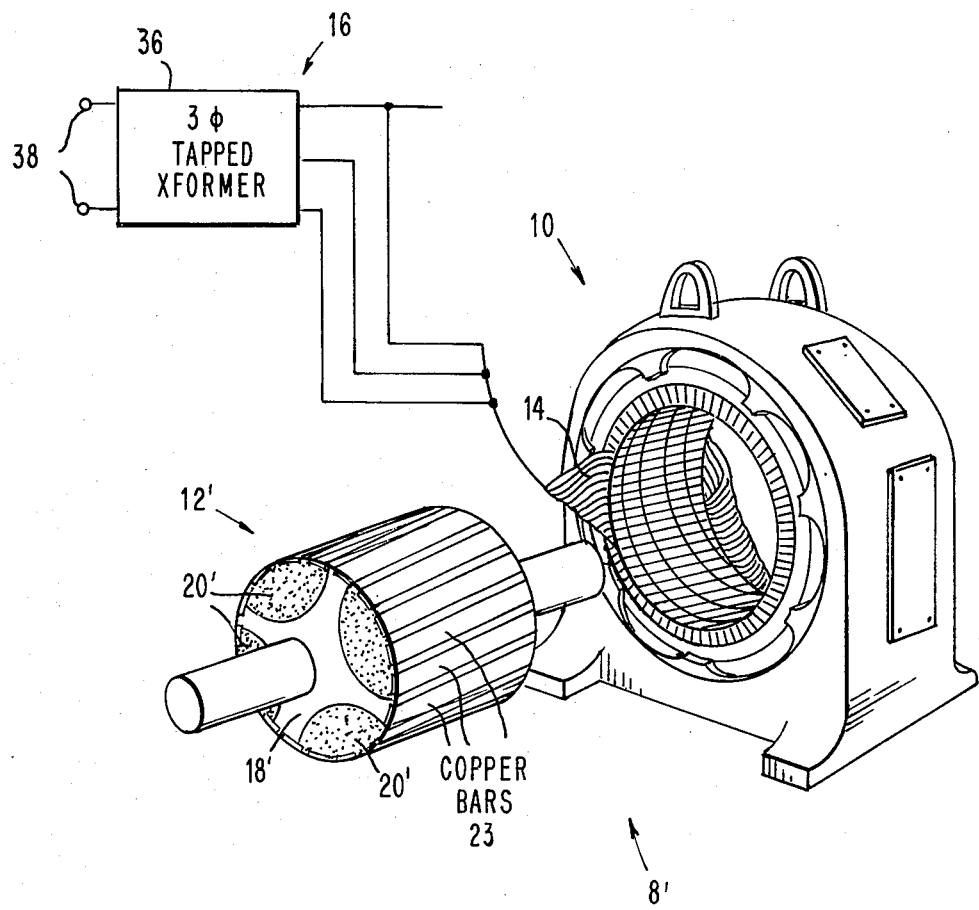
FIG. 2 is a perspective view of the rotating synchronous reactor.

An alternative embodiment shown in FIGS. 2 and 4.1, may involve a synchronous rotating reactor 8' wherein the rotor 12' has a salient pole configuration with no field winding but with damper bars of the type shown in FIGS. 2 and 4.1 to provide damping and starting torque. In such an alternative embodiment, the rotating reactor would be locked in synchronism by reluctance, i.e., saliency, torque.

The rotor construction shown in FIGS. 2 and 4.1 consists of a spider 18' of nonmagnetic material such as stainless steel and solid pole pieces 20' of ferro magnetic material with sharp saturation properties. The cross-sectional shape of the pole pieces 20' would be designed so as to produce a uniform flux density in the pole material and thereby produce a very sharp saturation characteristic.

FIG. 4.2 shows the concept of stacking appropriate shapes and composition of magnetic material in a two pole design. Here, a two pole rotor 12" is composed of sections 20" of magnetic material designed to give desired saturation characteristics, and non-magnetic rotor portions 18".

A further alternative embodiment, also not shown, of the saturable reactor of the present invention involves delegating the task of rotation to a synchronous poney motor, not shown, in tandem with the rotating reactor which in turn could be either a salient magnetic rotor struction or a symmetrical structure.

It is to be understood that since there is no prime mover or driven load involved in the voltage control system of the present invention, there is no requirement for a particular rotor speed. The choice of rotor speed can therefore be optimized based on structural preferences and minimization of windage losses.

Figure 5:
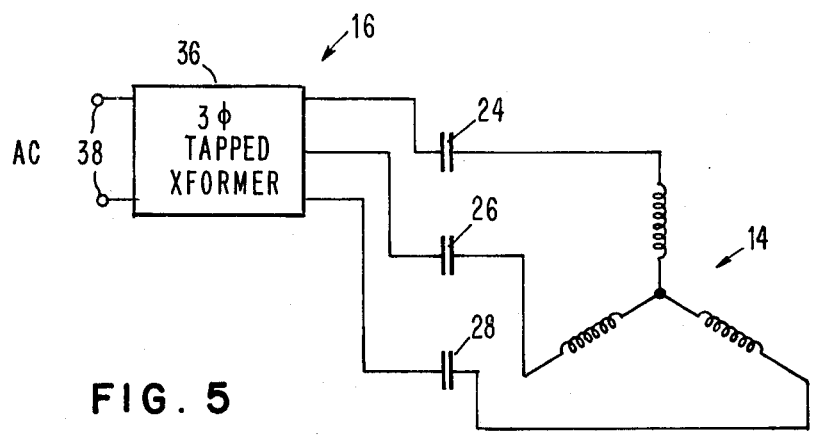
FIG. 5 is a schematic diagram of the application of the present invention employing either type of rotating reactor connected to a high voltage system through a tapped step up transformer and including slope correcting series capacitor compensation.

With respect to the incremental saturated inductance of the rotating induction reactor 8 or the rotating synchronous reactor 8' of the present invention, it is essentially the air core inductance of the stator winding 14. If desired, series capacitors can preferably be employed to compensate for or to reduce the droop characteristic of this incremental inductance to practically zero. Such a compensation network is show by way of example in FIG. 5 which illustrates capacitors 24, 26 and 28 respectively connected in series on each of the three phase source lies 16a, 16b, 16c leading into the three terminals, respectively, of the stator winding 14 of the rotating induction reactor 8 or rotating synchronous reactor 8' of the present invention.

Figure 6:
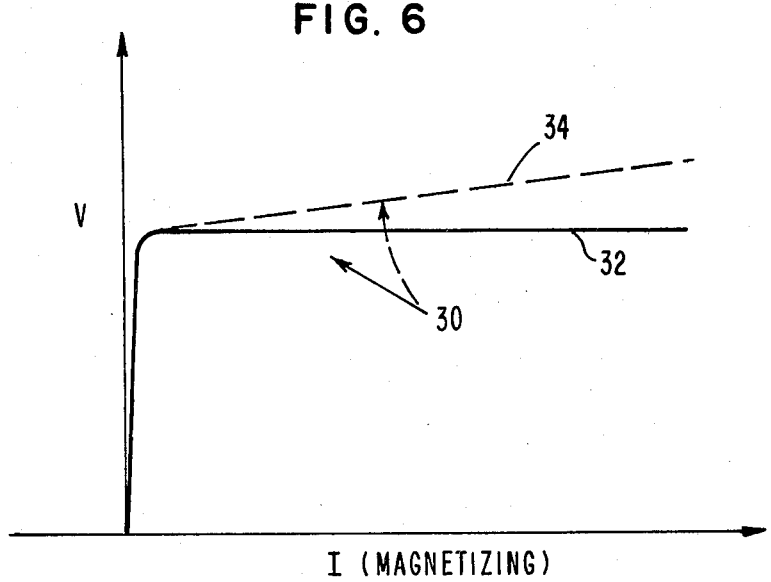
FIG. 6 is a graphic illustration of the voltage current relationship of the rotating reactor with and without slope correcting series capacitor compensation.

Referring now to FIG. 6 a graphic illustration of the relationship between the voltage and the magnetizing current of the rotating reactor 8 of the present invention is shown for both a system employing the compensation network of FIG. 3 in conjunction with the rotating reactor 8 of the present invention as well as the rotating reactor 8 without such a compensation network. The normal operating point is indicated in FIG. 6 by the numeral 30 on the curves 32 and 34, where the curves 32 and dotted line curve 34, respectively, represent the V-I characteristics of the rotating reactor B of the present invention with and without the series compensation network of capacitors 24, 26 and 28. Thus, as shown in FIG. 6 the slope of the V/I characteristic beyond the knee of saturation can be changed by adding the series capacitor compensation of FIG. 5. In addition, the voltage level, from the system standpoint, at the knee of saturation can be changed by operation of taps on a transformer 36, linking the rotating reactor 8 to the high voltage system shown by lines 38.

We claim:
1. Apparatus for controlling high voltage by absorption of capacitive vars, comprising: a stator including a core and a stator windings connected to a source of said high voltage; and a rotor having a symmetrical uniform magnetic structure including a rotor spider made of a core of non-magnetic material disposed around the shaft of said rotor and a concentric outer cylinder of magnetic material around said non-magnetic core and designed to yield a sharp magnetic saturation, said rotor also including longitudinally extending damper bars made of a conducting material and attached to said rotor around the cylindrical rotor surface, said damper bars producing the required starting torque and damp- ing of rotor oscillations, said rotor being operated with said stator as a free running, unloaded induction motor; whereby said rotor and said stator constitute a rotating induction reactor which functions similar to a saturable reactor with respect to var versus voltage absorption but produces a negligible amount of harmonics.

2. Apparatus for controlling high voltage by absorption of capacitive vars, comprising: a stator including a core and stator windings connected to a source of said high voltage; and a rotor including a spider of non-magnetic material disposed around a rotor shaft, multiple pole pieces made of magnetic material located adjacent said spider of non-magnetic material, said pole pieces being designed to carry uniform flux density with a sharp saturation occurring evenly along the flux path, and longitudinally extending damper bars made of conducting material and attached to said rotor around the cylindrical rotor surface, said damper bars producing the required starting torque and damping of rotor oscillations, said rotor being operated with said stator as a free running, unloaded reluctance motor; whereby said rotor and said stator constitute a rotating synchronous reactor which functions similar to a saturable reactor with respect to var versus voltage absorption but produces a negligible amount of harmonics.

3. Apparatus as recited in claims 1 or 2 further comprising capacitance connected in series with said stator windings as a compensation means to reduce the droop characteristic of the incremental saturated inductance of said induction reactor to almost zero.

4. Apparatus as recited in claims 1 or 2 wherein said stator windings are arranged in a three phase connection, and said source of high voltage is connected to said stator windings by transformer means.

5. Apparatus as recited in claims 1 or 2, wherein said rotor damper bars are made of copper.

6. Apparatus as recited in claim 3, wherein said rotor damper bars are made of copper.

7. Apparatus as recited in claim 6, wherein said stator windings are arranged in a three phase connection, and said source of high voltage is connected to said stator windings by transformer means.

8. Apparatus as recited in claim 3, wherein said stator windings are arranged in a three phase connection, and said source of high voltage is connected to said stator windings by transformer means.

9. Apparatus as recited in claims 1 or 2, wherein said rotor damper bars are imbedded in said rotor.

10. Apparatus as recited in claim 9, wherein said rotor damper bars are made of copper.

11. Apparatus as recited in claim 2, wherein said stator windings are arranged in a three phase connection, and said capacitance means are connected in series with each of the three phases of said stator windings.

12. Apparatus as recited in claim 1 further comprising end rings mounted at the opposite ends of said rotor adjacent said rotor damper bars for connecting said damper rotor bars.

13. Method of controlling high voltage by absorption of capacitive vars in a high voltage system, comprising the steps of:
connecting rotating synchronous reactor to a source of high voltage to be controlled, said rotating reactor including a stator having its windings connected to said high voltage source, and a rotor including a spider of non-magnetic material disposed around a rotor shaft, multiple magnetic pole pieces located adjacent said spider and producing a uniform flux density with a sharp saturation occuring evenly along the flux path, and said rotor also having conductive elements thereon for producing the required starting torque and damping of rotor oscillations; and operating said rotor with said stator as a free running, unloaded reluctance motor; whereby said rotating synchronous reactor functions similar to a saturable reactor with respect to var versus voltage absorption but produces a negligible amount of harmonics.

14. Method for controlling high voltage by absorption of capacitive vars in a high voltage system, comprising the steps of:
connecting a rotating induction reactor to a source of high voltage to be controlled, said induction reactor including a stator having its windings connected to said high voltage source, and a rotor having a symmetrical uniform magnetic structure designed to exhibit sharp saturation, said rotor including a rotor spider made of a core of non-magnetic material disposed around the shaft of said rotor and a concentric outer cylinder of magnetic material around said non-magnetic core and designed to yield a sharp magnetic saturation, said rotor also having conductive elements thereon for producing the required starting torque and damping of rotor oscillations; and operating said rotor with said stator as a free running, unloaded induction motor; whereby said rotating induction reactor functions similar to a saturable reactor with respect to var versus voltage absorption but produces a negligible amount of harmonics.

15. Method as recited in claims 13 or 14 further comprising the step of reducing the droop characteristic of the incremental saturated inductance of said rotating synchronous or induction reactor to zero by connecting compensation capacitance means in series with said stator windings.

16. Method as recited in claim 13 further comprising the steps of arranging said stator windings in a three phase connection and connecting said source of high voltage to said stator windings by transformer means.

17. Method as recited in claim 13 further comprising the step of arranging said stator windings in a three phase connection and connecting said capacitance means in series with each of the three phases of said stator windings.

18. Method as recited in claims 13 or 14 further comprising the steps of arranging said stator windings in a three phase connection and connecting said source of high voltage to said stator windings by transformer means.

19. Apparatus for controlling high voltage by absorption of capacitive vars, comprising: a stator including a core and a stator windings connected to a source of said high voltage; and a rotor having a symmetrical uniform magnetic structure including a rotor spider made of a core of non-magnetic material disposed around the shaft of said rotor and a concentric outer cylinder of magnetic material around said non-magnetic core and designed to yield a sharp magnetic saturation, said rotor also including a cylindrical sleeve of non-magnetic, conducting material concentrically disposed around said cylinder of magnetic material is said rotor for providing paths for the slip frequency currents produced through induction, said rotor being operated with said stator as a free running, unloaded induction motor; whereby said rotor and said stator constitute a rotating induction reactor which functions similar to a saturable reactor with respect to var versus voltage absorption but produces a negligible amount of harmonics.

* * * * *